July 23, 1963 R. DEMING 3,098,385
LIQUID MEASURING DEVICE
Filed May 27, 1960 2 Sheets-Sheet 1
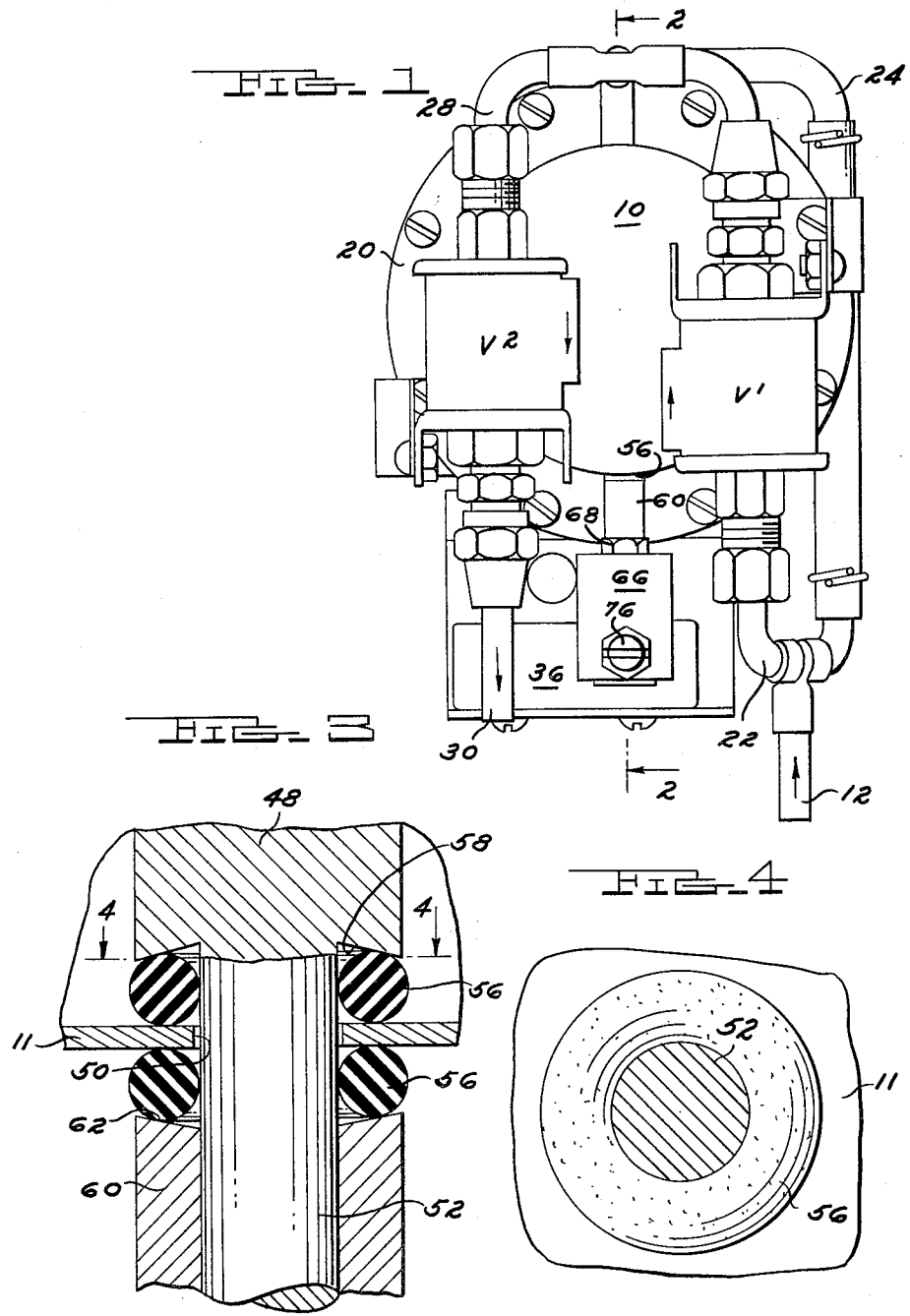
INVENTOR.
ROY DEMING
BY
Burton & Parker
ATTORNEYS July 23, 1963 R. DEMING 3,098,385
LIQUID MEASURING DEVICE
Filed May 27, 1960 2 Sheets-Sheet 2
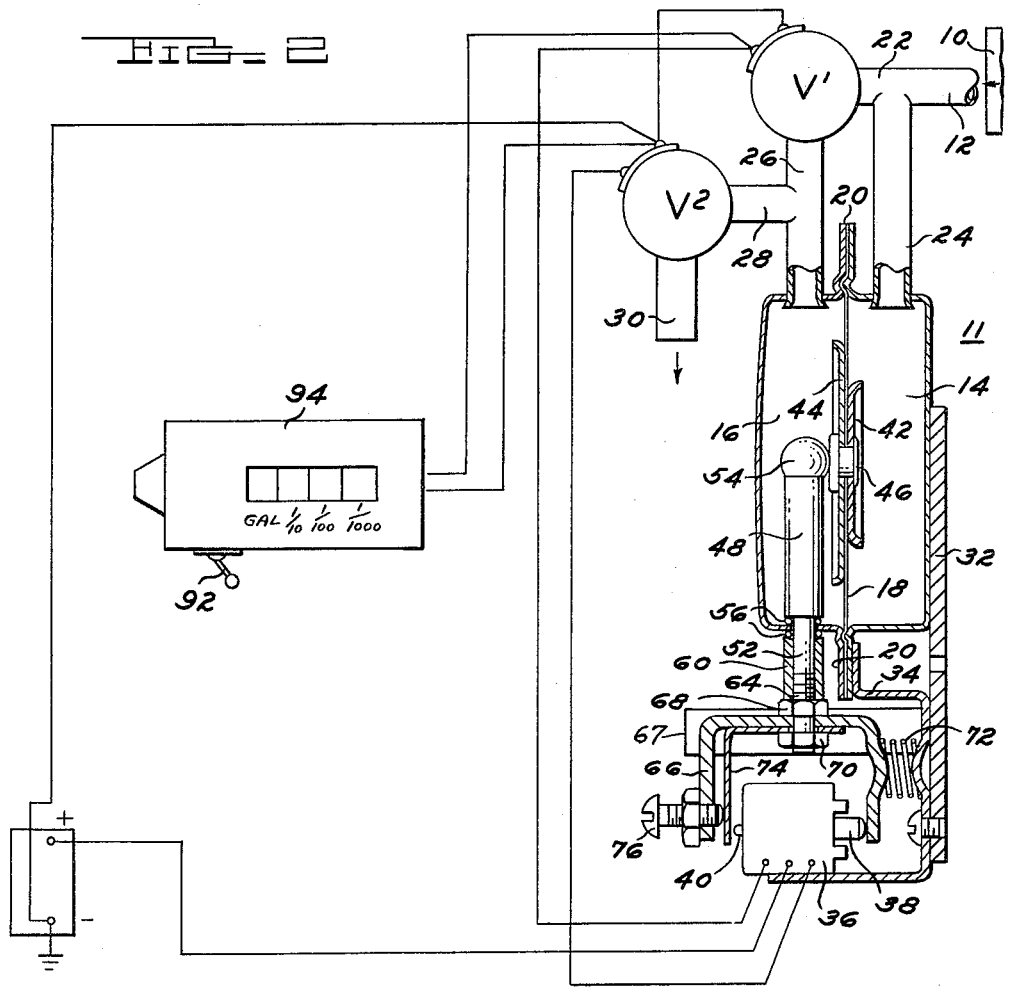
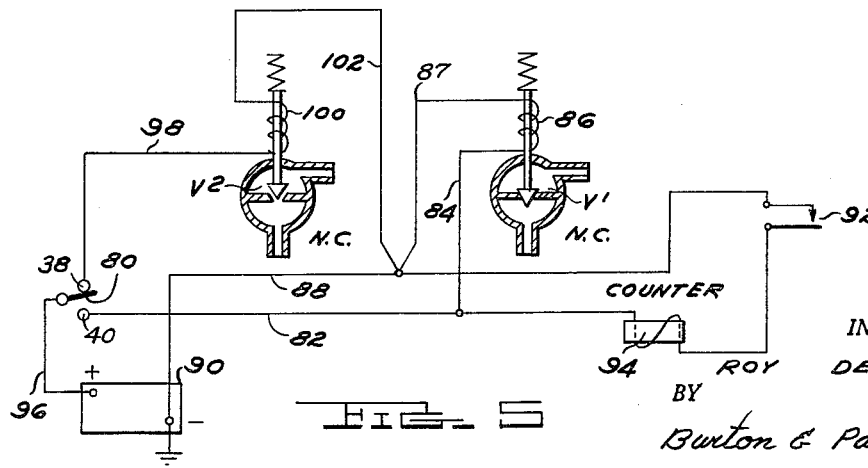
INVENTOR.
ROY DEMING
BY
Burton & Parker
ATTORNEYS United States Patent Office 3,098,385
Patented July 23, 1963

3,098,385
LIQUID MEASURING DEVICE
Roy Deming, Royal Oak, Mich., assignor to Kent-Moore Organization, Inc., Warren, Mich., a corporation of Michigan
Filed May 27, 1960, Ser. No. 32,222
11 Claims. (Cl. 73—270)

This invention relates to a device adapted to receive and discharge liquid and to discharge the same in measured increments and to indicate the amount discharged over a period of time.

An object is the provision of a device of the character set forth that is particularly adapted for use as a gauge to measure the discharge of liquid fuel to an internal combustion engine to determine the quantity of fuel used over a period of time or travelled distance.

Another object is to carry out the procedure set forth hereinabove in an efficient, accurate manner and in a simple device capable of being manipulated and read by an operator with a minimum of experience and training, and which device is not only simple but inexpensive.

A further object is the provision of a device of the character hereinabove set forth which is adaptable for use with a wide variety of internal combustion engines. For example, depending upon the engine, the gasoline may be delivered under a pressure of anything from two pounds to seven pounds p.s.i. This device is so constructed as to be adapted for insertion in the gasoline delivery system between the pump and the carburetor of the engine to accurately respond to these different pressures depending upon the character of the system in which the same is employed.

A feature of importance is that the operating mechanism of my device, which delivers the gas in metered increments to the carburetor, may be disposed underneath the hood of the vehicle, while the counter mechanism, which indicates the amount of gas being delivered, may be disposed on the dash of the vehicle directly in front of the driver so that the driver may know at a glance just how much gas has been delivered from a determined starting point. Only one attendant is required, namely, the vehicle driver.

Another feature of importance is that the simplicity of the assembled components of the device is such that readily available conventional components may be used.

The device is so constructed that during each complete cycle of operation a determined increment of gasoline is delivered to the engine and an accurate count is kept of the number of such increments. The construction is such that delivery is made during only one-half of each cycle of operation of the device. In other words, the chamber from which gasoline is delivered is filled during each cycle and a measured increment of gasoline is discharged during each cycle. These functions succeed each other in such a manner that the delivery of liquid occurs only during one-half of the cycle. This permits simplicity of construction and operation. The time interval between successive deliveries is so short that each such interval might not exceed one second, so that continuous efficient functioning is obtained.

Another meritorious feature of the device is that it comprises a liquid-containing vessel adapted to receive liquid fuel from a pump or the like and to deliver the same in metered increments to a carburetor or the like. The liquid-containing vessel is divided by a diaphragm into two chambers. A liquid delivery system is associated with the vessel and so communicates therewith and is so controlled by valve mechanism that liquid is delivered thereby into one chamber on one side of the diaphragm to create pressure therein in excess of the pressure on the opposite side of the diaphragm so that the diaphragm flexes toward such opposite side and discharges a metered increment of liquid from such other chamber to the carburetor. This constitutes one-half (the discharge half) of one cycle. When such metered increment has been discharged from said other chamber, such other chamber is closed to further discharge and liquid is delivered to such other chamber until such other chamber is re-filled with liquid and the liquid pressure on both sides of the diaphragm is substantially equalized. This constitutes the second half of the cycle. At this point such other chamber is again opened to discharge and the exhaust half of the cycle is repeated.

The device includes, in addition to the vessel provided with the two chambers and the liquid delivery system communicating therewith as hereinabove described, valve mechanism and electric control mechanism associated with such valve mechanism. An electric circuit is provided, which includes the electric control mechanism for the valves and also includes an electric counter which registers the number of cycles of delivery, and switch mechanism responsive to movement of the diaphragm to open and close the circuit and the valves to control the flow of liquid through the system in a predetermined manner.

Another meritorious feature is the provision of a liquid-containing vessel as hereinabove set forth provided with a flexible diaphragm separating its interior into two chambers and simple, efficient wobble shaft means extending from the interior of one chamber to the outside of the vessel and coupled with the electric switch mechanism to actuate the same. This wobble shaft portion of the linkage, which includes the diaphragm and the switch mechanism is so mounted within the vessel as to prevent leakage of liquid through the employment of simple mounting and sealing means.

The wobble shaft arrangement with the mounting and sealing means herein shown is believed to be novel in its own right independently of the remaining features of the gas gauge structure.

Other objects, advantages, and meritorious features will more fully appear from the following description, claims, and accompanying drawings, wherein:

FIG. 1 is a general and somewhat schematic elevation of my device as assembled for installation within a liquid system such as might be employed on a motor vehicle for the delivery of gas to the engine;

FIG. 2 is a vertical cross-sectional view taken on the line 2—2 of FIG. 1 showing the interior of the two chambers and the switch mechanism and illustrating diagrammatically the electrical circuit arrangement;

FIG. 3 is an enlarged sectional view through the wobble shaft mounting in the wall of the vessel;

FIG. 4 is a horizontal sectional view taken on the line 4—4 of FIG. 3;

FIG. 5 is a diagrammatic illustration of the electrical circuit arrangement showing the valves schematically and electrical control means for actuating the valves;

This measuring device is adapted to be coupled into a fuel line such as would lead from a pump 10 to the carburetor, not shown, of an internal combustion engine of a motor vehicle. The liquid delivery conduit leading from the pump to the device is indicated as 12. The device itself includes a liquid containing vessel 11 divided into two chambers 14 and 16 by a flexible diaphragm 18. This diaphragm extends normally unflexed, as shown in FIG. 2, between these two chambers 14 and 16, and is held in such extended position by flanges 20 formed on the two halves of the vessel and suitably secured together. This diaphragm would be formed of suitable tough, flexible material.

The conduit 12 leads through a branch 22 to a valve

V-1, and through a branch 24 into chamber 14 of the vessel 11 as shown most particularly at FIG. 2. The valve V-1 into which branch 22 of conduit 12 leads has a delivery conduit 26 leading therefrom into chamber 16 of the vessel, as shown in FIG. 2. This delivery conduit 26 has a branch 28 which extends to valve V-2. This valve V-2 has a delivery line 30 which extends therefrom to a point of delivery such as the carburetor of an internal combustion engine. The flow of liquid through this system to and from the chambers of the vessel is controlled by these valves.

The vessel 11 has a bracket 32 secured thereto, as shown, which bracket may be used to mount the vessel and which bracket also carries a switch-supporting bracket 34. This switch-supporting bracket 34 is also secured to a portion of the flange 20 of the vessel, as shown in FIG. 2. This switch-supporting bracket carries a switch 36. The switch 36 comprises conventional switch mechanism adapted to move a switch element from one closed position to another closed position. This switch mechanism is actuated in one direction by a reset button 38 to one closed position and in the opposite direction by a starter button 40.

The diaphragm carries a pair of washers 42 and 44 held thereto by rivet 46. These washers are of different diameters so that the diaphragm may flex in opposite directions along different lines. This specific structure is conventional.

A wobble shaft 48 is provided. This is mounted in chamber 16 of the vessel and extends through the wall thereof as shown particularly in FIG. 2. The wall of the vessel is provided with an opening 50 oversize the reduced portion 52 of the wobble shaft. This is shown particularly in FIG. 3 where the wall of the vessel is indicated as 11. The head of the wobble shaft is indicated as 54 and is shown as disposed opposite the rivet 46 of the diaphragm so as to be actuated thereby.

Two sealing rings formed of compressible material such as rubber of the usual O-ring type of construction are indicated as 56. These sealing rings embracingly encircle the reduced diameter portion 52 of the wobble shaft 48 as shown in FIG. 3. These sealing rings are of a size to be sealed against the shaft and against the wall of the vessel to prevent leakage of liquid therefrom. The shaft 48 is undercut at an angle as indicated at 58 so that one sealing ring 56 is urged against the wall of the vessel and against the shaft itself. The reduced diameter portion 52 of the shaft, outside of the vessel, carries a cylindrical spacer 60. This spacer is also undercut as shown in FIG. 3 at 62 so that the O-ring 56, which rests thereupon, is held securely against the wall of the vessel and against the reduced diameter portion 52 of the shaft, as shown in FIG. 3.

The extreme lower threaded end 64 of the wobble shaft carries a yoke 66, which is secured by nuts 68 and 70 to the shaft itself. These nuts are threadedly adjustable upon the reduced diameter end of the shaft to hold the sleeve 60 up tightly against the sealing ring and such sealing rings are thereby placed under compression to form an effective seal against opposite sides of the vessel wall and against the shaft.

The wobble shaft 48 is adapted to be actuated by the diaphragm 18 as hereinafter described and by a spring 72 which is held under compression between the bracket 34 and the yoke 66, as shown in FIG. 2. This spring 72 exerts a light pressure, tending to urge the yoke 66 toward the reset button 38 of the switch 36 when the wobble shaft occupies the position shown in FIG. 2 and the liquid pressure within the two chambers 14 and 16 of the vessel 11 is substantially equalized.

The yoke 66 carried on the lower end of the wobble shaft 48 is held against accidental rotatable displacement by a guide 67. This guide may be formed of a suitable slippery plastic strip such as Teflon or the like. It is supported by the brackets 32 and 34 as shown in FIG. 2. The yoke slides along this guide 67 in the swinging reciprocation of the wobble shaft, and is held by this guide to a straight line swing.

The yoke carries an angular contact element 74 mounted upon the lower threaded end of the wobble shaft as shown in FIG. 2. The opening through the contact element is oversize the reduced end of the wobble shaft as shown to permit the adjustment of such contact element 74 by the screw 76 toward and away from switch contact 40. Contact element 74 is adapted to engage the starter button 40 of the switch mechanism 36 when the upper end of the wobble shaft is swung to the left from the position shown in FIG. 2 by the diaphragm.

The liquid system of the device is coupled up in the fuel line of a motor vehicle, leading from the pump or the like to the carburetor. The electrical portion of the system is connected with the ignition system of the motor vehicle so as to be controlled by the ignition switch thereof. This is hereinafter described in connection with the description of the electrical circuit.

As to the liquid delivery system, considering FIG. 2 of the drawings, valve V-1 is closed and valve V-2 is open, the diaphragm is disposed between the two chambers 14 and 16, and both of these chambers are full of liquid, and the liquid pressures therein are equalized. The reset button has just been actuated and liquid is beginning to flow from chamber 16 through valve V-2 and discharge 30 to the carburetor. Liquid continues to be delivered into chamber 14 and this moves the diaphragm toward chamber 16 and swings the upper end of the wobble shaft 48 toward the left. This movement of the wobble shaft swings its lower end to the right, and the yoke 66 is moved to the right against the tension of the spring 72. This movement of the diaphragm to the left constitutes the discharge half of the cycle and continues until a determined increment of liquid has been discharged from chamber 16 through valve V-2 and line 30.

When this half of the cycle is completed the adjustable contact bracket 74 has been brought into engagement with the starter button 40 of the switch, and such reverses the switch mechanism 36 and the valve V-1 is opened and the valve V-2 is closed, and the other half of the cycle is instituted. At this point liquid is delivered into both chambers 14 and 16 instead of only into chamber 14. When chamber 16 is filled with liquid and the diaphragm has been returned to the intermediate position shown in FIG. 2 and the pressure of liquid in the two chambers have been equalized, spring 72 urges the yoke 66 to actuate the reset button 38 and the switch is again reversed. The spring 72 takes charge of the switch as the pressures in the two chambers have been equalized. The spring 72, while not sufficient to overcome the liquid pressure, is sufficient to swing the wobble shaft to follow the diaphragm. When the wobble shaft has reached the position shown in FIG. 2, contact will be made by the yoke with the reset button 38, and the switch will be thrown to the closed position at which valve V-1 will be closed and valve V-2 will be opened and a second discharge of liquid from chamber 16 will be instituted.

A complete cycle of liquid movement is comprised by a discharge of a measured increment from chamber 16 of liquid, which discharge constitutes one-half cycle, and then the refilling of chamber 16 following the shutting off of the discharge valve and the movement of the diaphragm back to the normal position shown in FIG. 2. The interval between successive discharges of increments of liquid is sufficiently short, as for example less than a second, so that the operation of the automobile engine will be uninterrupted and continuous.

The electrical system which controls the valves V-1 and V-2 to function as hereinabove described is schematically shown in FIGS. 2 and 5. This electrical system is connected up with the two sides of the car battery 90 as shown in FIG. 5. Normally, when there is no current in the circuit of the system, both valves V-1 and V-2 are closed, and if there is no fluid in the chambers 14 and 16 so that the wobble shaft is in neutral position, the spring 72 holds yoke 66 against reset button 38.

Referring now to FIG. 2, the shiftable switch element 80 is shown in contact with the reset button 38 (the two chambers 14 and 16 are full of liquid, the liquid pressures within the chambers are equalized, liquid is flowing toward chamber 14, and it is the instant of the beginning of the discharge half of the cycle.) The valve V–1 has been closed and the valve V–2 has been opened. The circuit is through lead 96 from battery 90 to switch element 80, contact 38, and from 38 through line 98 to solenoid 100 holding valve V–2 open against its spring. The current return is through branch line 102 and line 88 to the battery 90. Valve V–1 is held closed by its spring.

When the diaphragm has moved to the position of exhausting the determined increment of liquid from chamber 16, that is, it has moved to the left sufficiently to swing the wobble shaft to cause contact member 74 to engage starter button 40 of the switch, the switch element 80 is swung away from contact 38 to 40, and solenoid 100 is de-energized and valve V–2 is closed by its spring. In this position the circuit is from the battery through line 96, switch elements 80 and 40, line 82, and branch 84 to solenoid 86, opening valve V–1. The return is through line 87 and back through 88 to the battery.

It will be noted that the counter switch 92 for the counter 94 is open. This is a manual switch. As a result, the counter is not actuated. This would be the normal position of the counter when the delivery of gas was not being tested, but the device was hooked up in the fuel line and ignition system of the automobile to respond to its functioning.

When it is designed to take a reading, the switch 92 of the counter 94 is closed and the circuit extends through the counter so as to register for each cycle. The counter is conventional. It may indicate increments varying from one-tenth to one-thousandth of a gallon of liquid. The diagrammatic portion of FIG. 2 agrees with that shown in FIG. 5.

What I claim is:

1. A liquid measuring device comprising, in combination, a liquid-containing vessel divided by a flexible diaphragm into first and second liquid-containing chambers, a liquid delivery system communicating with both chambers to deliver liquid thereinto or to discharge liquid from said first chamber, valve means in said system controlling the flow of liquid therein operable to deliver liquid into both chambers simultaneously or into said second chamber only and to discharge liquid in measured increments from said first chamber, an electric circuit including valve control mechanism for the valve means, said circuit including switch mechanism operable to one position to make the circuit through said valve control mechanism to actuate the valve means to permit liquid to be admitted into both chambers simultaneously and to prevent liquid from being discharged from said first chamber, said switch mechanism operable to a second position to make the circuit through said valve control mechanism to actuate the valve means to permit liquid to be delivered into said second chamber only and to permit liquid to be discharged from said first chamber in a measured increment to thereby complete a single cycle of delivery of liquid into and discharge of a measured increment of liquid from said vessel, said diaphragm being responsive to flexure under pressure of admission of liquid into said second chamber only to cause liquid to be discharged from said first chamber in measured increment.

2. A liquid measuring device as defined in claim 1 characterized in that an electric counter is provided responsive to the making of the circuit during each cycle to count up the number of cycles completed.

3. A liquid measuring device as defined in claim 1 characterized in that said diaphragm is responsive to the delivery of liquid into said second chamber to flex when the pressure of said liquid exceeds a predetermined volume toward said first chamber and exhaust a measured increment of liquid therefrom, said diaphragm being coupled with said switch mechanism whereby, upon movement of the diaphragm to discharge a measured increment of liquid from said first chamber, the switch mechanism is shifted as such discharge is completed to energize the valve control mechanism to actuate the value control means to close said first chamber to discharge of liquid therefrom and to open said first chamber to permit delivery of liquid thereinto until the liquid pressure in both chambers is substantially equalized and the diaphragm has returned to a substantially normal position between said chambers, and further characterized in that such switch mechanism includes a spring acting thereupon to shift the switch to open said first chamber to discharge of liquid therefrom.

4. In a liquid measuring device, a liquid-containing vessel having a diaphragm partition separating its interior into two liquid-containing chambers, a liquid delivery system communicating with said two chambers to deliver liquid into the vessel and to discharge liquid therefrom, means controlling the flow of liquid within the system responsive to the movement of the diaphragm to permit liquid to flow into one only of said chambers to urge the diaphragm toward the other chamber to discharge a measured increment of liquid therefrom, said means controlling the flow of liquid within the system also receptive to the completion of this discharge movement of the diaphragm to close said other chamber to the discharge of liquid therefrom and to permit liquid to flow into both chambers simultaneously until the pressure of liquids within said two chambers is substantially equalized.

5. In a liquid measuring device as defined in claim 4, a counter coupled therewith and automatically responsive to each complete liquid intake and discharge cycle to count the cycles of said operation for a given period.

6. A liquid measuring device as defined in claim 4 characterized in that the means controlling the flow of liquid within said system includes an electric circuit and a switch operable to make and break the circuit which switch is responsive in part to the movement of the diaphragm and includes a spring acting upon the switch to shift the same when the liquid pressure on opposite sides of the diaphragm is substantially equalized.

7. A liquid measuring device as defined in claim 6 characterized in that an electric counter is included in the electric circuit and responsive to the making of the circuit once during each cycle to count the number of cycles during a given period.

8. A liquid measuring device as defined in claim 6 characterized in that the switch mechanism within the electric circuit is coupled by a wobble shaft which is supported to extend through the wall of the vessel to be actuated by the diaphragm to one position of making the circuit when the diaphragm has completed its movement of discharge of liquid from said other chamber and to in turn actuate the switch.

9. A liquid measuring device as defined in claim 8 characterized in that the wobble shaft extends through an opening in the wall of the vessel which is oversize the dimension of the shaft to permit free wobbling movement and the shaft is provided with a pair of compressible sealing rings embracingly mounted thereupon upon opposite sides of the wall of the vessel surrounding the shaft opening therethrough, and the shaft is also provided with a pair of opposed shoulders one on the inside of the wall and the other on the outside of the wall which shoulders engage the sealing rings and hold them toward the wall of the vessel.

10. A liquid-containing vessel having a shaft opening through its wall and provided with a motion-transmitting wobble shaft extending from a point within the vessel through said opening in the wall to a point outside of the vessel, said shaft being supported for motion-transmitting wobbling movement within said opening, said shaft provided within the vessel with a laterally projecting shoulder part adjacent to but spaced from the wall of the vessel surrounding the opening, a compressible sealing ring embracing the shaft within the vessel disposed between the shoulder part and the wall of the vessel, a spacer freely surrounding the shaft outside of the vessel, a compressible sealing ring embracing the shaft between the spacer and the outside of the vessel wall adjacent to and surrounding the opening through the vessel wall, and tightening means mounted upon the shaft outside of the vessel wall engaging the spacer and adjustable to various positions upon the shaft to hold both sealing rings under compression about the shaft and against opposite sides of the vessel wall, said shaft characterized in that the face of its shoulder part which is within the vessel and adjacent to the sealing ring is undercut on a bevel to partially receive the sealing ring and urge said ring toward the shaft upon compression of the ring against the wall of the vessel, and the upper end of the spacer surrounding the shaft outside of the vessel and adjacent to its sealing ring is undercut on a bevel to partially receive its sealing ring and urge said ring toward the shaft upon compression of the ring against the wall of the vessel.

11. In a liquid measuring device, a liquid-containing vessel having a diaphragm partition separating its interior into two liquid-containing chambers, a liquid delivery system communicating with said two chambers to deliver liquid into the vessel and to discharge liquid therefrom, means controlling the flow of liquid within the system responsive to the movement of the diaphragm to permit liquid to flow into one only of said chambers to urge the diaphragm toward the other chamber to discharge a measured increment of liquid therefrom, said means controlling the flow of liquid within the system also receptive to the completion of this discharge movement of the diaphragm to close said other chamber to the discharge of liquid therefrom and to permit liquid to flow into both chambers simultaneously until the pressure of liquids within said two chambers is substantially equalized, said means controlling the flow of liquid within said system including an electric circuit provided with a switch to make and break said circuit, a wobble shaft supported to extend through an opening in the wall of the vessel and having its end within the vessel disposed to form a coupling connection with the diaphragm to be actuated thereby and having its end outside of the vessel disposed to form a coupling connection with said switch to actuate the switch, means sealing the wobble shaft within the opening through the wall of the vessel against leakage of liquid from the vessel through said opening, said coupling connection of the end of the wobble shaft outside of the wall of the vessel with the switch including means adjustable to vary the distance of swing of the wobble shaft required to actuate the switch.

References Cited in the file of this patent
UNITED STATES PATENTS

| | | |
|---|---|---|
| 194,523 | Lipe | Aug. 28, 1877 |
| 1,605,446 | Kishline | Nov. 2, 1926 |
| 1,740,682 | Carrey | Dec. 24, 1929 |

FOREIGN PATENTS

| | | |
|---|---|---|
| 715,135 | Great Britain | Sept. 8, 1954 |
| 790,798 | Great Britain | Feb. 19, 1958 |